US012699893B2

(12) United States Patent
Grill et al.

(10) Patent No.: US 12,699,893 B2
(45) Date of Patent: Aug. 4, 2026

(54) SELF-SUPERVISED REPRESENTATION LEARNING USING BOOTSTRAPPED LATENT REPRESENTATIONS

(71) Applicant: GDM Holding LLC, Mountain View, CA (US)

(72) Inventors: Jean-Bastien François Laurent Grill, Paris (FR); Florian Strub, Paris (FR); Florent Altché, Paris (FR); Corentin Tallec, Paris (FR); Pierre Richemond, London (GB); Bernardo Avila Pires, London (GB); Zhaohan Guo, London (GB); Mohammad Gheshlaghi Azar, London (GB); Bilal Piot, London (GB); Remi Munos, London (GB); Michal Valko, Paris (FR)

(73) Assignee: GDM Holding LLC, Mountain View, CA (US)

( * ) Notice: Subject to any disclaimer, the term of this patent is extended or adjusted under 35 U.S.C. 154(b) by 1276 days.

(21) Appl. No.: 17/338,777

(22) Filed: Jun. 4, 2021

(65) Prior Publication Data

US 2021/0383225 A1     Dec. 9, 2021

Related U.S. Application Data

(60) Provisional application No. 63/039,343, filed on Jun. 15, 2020, provisional application No. 63/035,583, filed on Jun. 5, 2020.

(51) Int. Cl.
*G06N 3/08*          (2023.01)
(52) U.S. Cl.
CPC ...................................... *G06N 3/08* (2013.01)
(58) Field of Classification Search
CPC .. G06N 3/00; G06N 5/00; G06N 7/00; G06N 20/00; G06N 99/00
See application file for complete search history.

(56) References Cited

U.S. PATENT DOCUMENTS

2019/0050727 A1*  2/2019  Anderson ................ G06N 3/08
2020/0143206 A1   5/2020  Kartal et al.

FOREIGN PATENT DOCUMENTS

CN        108701253 A      10/2018
CN        109492666 A       3/2019
(Continued)

OTHER PUBLICATIONS

X. Yao, T. Huang, C. Wu, R. Zhang and L. Sun, "Towards Faster and Better Federated Learning: A Feature Fusion Approach," 2019 IEEE International Conference on Image Processing (ICIP), Taipei, Taiwan, 2019, pp. 175-179, doi: 10.1109/ICIP.2019.8803001. (Year: 2019).*

(Continued)

*Primary Examiner* — Kakali Chaki
*Assistant Examiner* — Johnathan R Germick
(74) *Attorney, Agent, or Firm* — Fish & Richardson P.C.

(57)          ABSTRACT

A computer-implemented method of training a neural network. The method comprises processing a first transformed view of a training data item, e.g. an image, with a target neural network to generate a target output, processing a second transformed view of the training data item, e.g. image, with an online neural network to generate a prediction of the target output, updating parameters of the online neural network to minimize an error between the prediction of the target output and the target output, and updating parameters of the target neural network based on the parameters of the online neural network. The method can effectively train an encoder neural network without using labelled training data items, and without using a contrastive loss, i.e. without needing "negative examples" which comprise transformed views of different data items.

20 Claims, 5 Drawing Sheets

(56) References Cited

FOREIGN PATENT DOCUMENTS

| | | |
|---|---|---|
| CN | 110880036 A | 3/2020 |
| CN | 110909815 A | 3/2020 |
| CN | 111126599 A | 5/2020 |
| CN | 111159367 A | 5/2020 |
| JP | 2018055259 | 4/2018 |
| JP | 2019528511 | 10/2019 |
| JP | 2019-219712 A | 12/2019 |
| JP | 2019220104 | 12/2019 |
| JP | WO 2020/110775 | 6/2020 |

OTHER PUBLICATIONS

Antti Tarvainen, & Harri Valpola. (2018). Mean teachers are better role models: Weight-averaged consistency targets improve semi-supervised deep learning results. (Year: 2018).*

Zhiqiang Shen, Zhankui He, & Xiangyang Xue. (2019). MEAL: Multi-Model Ensemble via Adversarial Learning. (Year: 2019).*

International Preliminary Report on Patentability in International Appln. No. PCT/EP2021/065071, dated Dec. 15, 2022, 12 pages.

International Search Report and Written Opinion in International Appln. No. PCT/EP2021/065071, dated Oct. 8, 2021, 18 pages.

Zhou et al., "Breaking Transferability of Adversarial Samples with Randomness," CoRR, Jun. 2018, arxiv.org/abs/1805.04613, 19 pages.

Office Action in Indian Appln. No. 202227053096, dated Feb. 8, 2023, 7 pages (with English translation).

Bachman et al., "Learning representations by maximizing mutual information across views," CoRR, Jun. 2019, arxiv.org/abs/1906.00910, 11 pages.

Bachman et al., "Learning with pseudo-ensembles," CoRR, Dec. 2014, arxiv.org/abs/1412.4864, 9 pages.

Becker et al., "Self-organizing neural network that discovers surfaces in random-dot stereograms," Nature, Jan. 1992, 355(6356):161-163.

Berg et al., "Birdsnap: Large-scale fine-grained visual categorization of birds," Proceedings of the IEEE Conference on Computer Vision and Pattern Recognition, 2014, pp. 2011-2018.

Berthelot et al., "Mixmatch: A holistic approach to semi-supervised learning," CoRR, May 2019, arxiv.org/abs/1905.02249, 14 pages.

Berthelot et al., "Remixmatch: Semi-supervised learning with distribution matching and augmentation anchoring," CoRR, Nov. 2019, arxiv.org/abs/1911.09785, 13 pages.

Bossard et al., "Food-101—mining discriminative components with random forests," European Conference on Computer Vision, 2014, pp. 446-461.

Brock et al., "Large scale GAN training for high fidelity natural image synthesis," CoRR, Sep. 2018, arXiv:1809.11096, 35 pages.

Caron et al., "Deep clustering for unsupervised learning of visual features," Proceedings of the European Conference on Computer Vision, 2018, pp. 132-149.

Chapelle et al., "Semi-supervised learning," IEEE Transactions on Neural Networks, Mar. 2009, 20(3):542.

Chen et al., "A simple framework for contrastive learning of visual representations," Proceedings of the 37th International Conference on Machine Learning, 2020, 119:1597-1607.

Chen et al., "Big self-supervised models are strong semi-supervised learners," CoRR, Jun. 2020, arXiv:2006.10029, 18 pages.

Cimpoi et al., "Describing textures in the wild," IProceedings of the IEEE Conference on Computer Vision and Pattern Recognition, 2014, pp. 3606-3613.

Cubuk et al., "Randaugment: Practical automated data augmentation with a reduced search space," Proceedings of the IEEE/CVF Conference on Computer Vision and Pattern Recognition (CVPR) Workshops, 2020, pp. 702-703.

Doersch et al., "Multi-task self-supervised visual learning," Proceedings of the IEEE International Conference on Computer Vision, 2017, pp. 2051-2060.

Doersch et al., "Unsupervised visual representation learning by context prediction," Proceedings of the IEEE International Conference on Computer Vision, 2015, pp. 1422-1430.

Donahue et al., "Adversarial feature learning," CoRR, May 2016, arxiv.org/abs/1605.09782?context=cs, 18 pages.

Donahue et al., "Decaf: A deep convolutional activation feature for generic visual recognition," Proceedings of the 31st International Conference on Machine Learning, 2014, 32(1):647-655.

Donahue et al., "Large scale adversarial representation learning," CoRR, Jul. 2019, arxiv.org/abs/1907.02544, 32 pages.

Dosovitskiy et al., "Discriminative unsupervised feature learning with convolutional neural networks," Neural Information Processing Systems, Jun. 2014, 13 pages.

Dumoulin et al., "Adversarially learned inference," CoRR, Jun. 2016, arXiv:1606.00704, 18 pages.

Everingham et al., "The Pascal visual object classes (VOC) challenge," International Journal of Computer Vision, Sep. 2009, 88(2):303-338.

Fei-Fei et al., "Learning generative visual models from few training examples: An incremental bayesian approach tested on 101 object categories," 2004 Conference on Computer Vision and Pattern Recognition Workshop, Jul. 2004, 9 pages.

Fukushima et al., "Neocognitron: A self-organizing neural network model for a mechanism of pattern recognition unaffected by shift in position," Biological Cybernetics, 1980, 36(4):193-202.

Gidaris et al., "Unsupervised representation learning by predicting image rotations," CoRR, Mar. 2018, arXiv:1803.07728, 16 pages.

Girshick et al., "Rich feature hierarchies for accurate object detection and semantic segmentation," Proceedings of the IEEE Conference on Computer Vision and Pattern Recognition, 2014, pp. 580-587.

github.com/google/jax [online], "JAX: composable transformations of Python+NumPy programs," Sep. 2020, retrieved on Jun. 21, 2021, retrieved from URL<https://github.com/google/jax>, 12 pages.

Gong et al., "Maxup: A simple way to improve generalization of neural network training," CoRR, Feb. 2020, arXiv:2002.09024, 10 pages.

Goodfellow et al., "Generative adversarial nets," CoRR, Jun. 2014, arxiv.org/abs/1406.2661, 9 pages.

Goyal et al., "Accurate, large minibatch sgd: Training imagenet in 1 hour," CoRR, Jun. 2017, arXiv:1706.02677, 12 pages.

Guo et al., "Bootstrap latent-predictive representations for multitask reinforcement learning," International Conference on Machine Learning, 2020, 119:3875-3886.

Harwood et al., "Smart mining for deep metric learning," Proceedings of the IEEE International Conference on Computer Vision, 2017, pp. 2821-2829.

Hasselt et al., "Deep reinforcement learning and the deadly triad," CoRR, Dec. 2018, arxiv.org/abs/1812.02648, 13 pages.

He et al., "Deep residual learning for image recognition," Proceedings of the IEEE Conference on Computer Vision and Pattern Recognition, 2016, pp. 770-778.

He et al., "Delving deep into rectifiers: Surpassing human-level performance on imagenet classification," In Proceedings of the IEEE international conference on computer vision, 2015, pp. 1026-1034.

He et al., "Momentum contrast for unsupervised visual representation learning," Proceedings of the IEEE/CVF Conference on Computer Vision and Pattern Recognition, 2020, pp. 9729-9738.

Hénaff et al., "Data-efficient image recognition with contrastive predictive coding," Proceedings of the 37th International Conference on Machine Learning, 2020, 119:4182-4192.

Hessel et al., "Rainbow: Combining improvements in deep reinforcement learning," In AAAI Conference on Artificial Intelligence, Apr. 2018, 32(1):3215-3222.

Hinton et al., "A fast learning algorithm for deep belief nets," Neural Computation, Jul. 2006, 18(7):1527-1554.

Hjelm et al., "Learning deep representations by mutual information estimation and maximization," CORR, Aug. 2018, arXiv:1808.06670, 24 pages.

https://github.com/deepmind/dm-haiku [online], "Haiku: Sonnet for JAX," Feb. 2020, retrieved on Jun. 30, 2021, retrieved from URL<https://github.com/deepmind/dm-haiku>, 11 pages.

(56)                          References Cited

OTHER PUBLICATIONS

Ioffe et al., "Batch normalization: Accelerating deep network training by reducing internal covariate shift," Proceedings of the 32nd International Conference on Machine Learning, 2015, 37:448-456.

Jain et al., "Improved baselines with momentum contrastive learning," CoRR, Mar. 2020, arXiv:2003.04297, 3 pages.

Kingma et al., "Auto-encoding variational bayes," CoRR, Dec. 2013, arxiv.org/abs/1312.6114, 14 pages.

Kingma et al., "Semi-supervised learning with deep generative models," CoRR, Jun. 2014, arxiv.org/abs/1406.5298, 9 pages.

Kolesnikov et al., "Revisiting self-supervised visual representation learning," CoRR, Jan. 2019, arxiv.org/abs/1901.09005, 13 pages.

Kornblith et al., "Do better ImageNet models transfer better?," Proceedings of the IEEE/CVF Conference on Computer Vision and Pattern Recognition, 2019, pp. 2661-2671.

Krause et al., "3D object representations for fine-grained categorization," Proceedings of the IEEE International Conference on Computer Vision (ICCV) Workshops, 2013, pp. 554-561.

Krizhevsky, "Learning multiple layers of features from tiny images," Technical report, University of Toronto, Apr. 8, 2009, 60 pages.

Laina et al., "Deeper depth prediction with fully convolutional residual networks," 2016 Fourth International Conference on 3D Vision, Oct. 2016, 12 pages.

Laine et al., "Temporal ensembling for semi-supervised learning," CoRR, Oct. 2016, arXiv:1610.02242, 13 pages.

Larsson et al., "Learning representations for automatic colorization," European Conference on Computer Vision, Sep. 2016, pp. 577-593.

Ledig et al., "Photo-realistic single image super-resolution using a generative adversarial network," Proceedings of the IEEE Conference on Computer Vision and Pattern Recognition, 2017, pp. 4681-4690.

Lee et al., "Pseudo-label: The simple and efficient semi-supervised learning method for deep neural networks," ICML 2013 Workshop: Challenges in Representation Learning, 2013, 6 pages.

Li et al., "Prototypical contrastive learning of unsupervised representations," CoRR, May 2020, arXiv:2005.04966, 16 pages.

Lillicrap et al., "Continuous control with deep reinforcement learning," CoRR, Sep. 2015, arXiv:1509.02971, 14 pages.

Long et al., "Fully convolutional networks for semantic segmentation," Proceedings of the IEEE Conference on Computer Vision and Pattern Recognition, 2015, pp. 3431-3440.

Loshchilov et al., "SGDR: stochastic gradient descent with warm restarts," CoRR, Aug. 2016, arxiv.org/abs/1608.03983, 16 pages.

Madry et al., "Towards Deep Learning Models Resistant to Adversarial Attacks," CoRR, Jun. 2017, arXiv:1706.06083, 28 pages.

Maji et al., "Fine-grained visual classification of aircraft," CoRR, Jun. 2013, arXiv:1306.5151, 6 pages.

Maria-Elena et al., "Automated flower classification over a large number of classes," 2008 Sixth Indian Conference on Computer Vision, Graphics & Image Processing, Dec. 2008, 8 pages.

Misra et al., "Self-supervised learning of pretext-invariant representations," Proceedings of the IEEE/CVF Conference on Computer Vision and Pattern Recognition, 2020, pp. 6707-6717.

Miyato et al., "Virtual adversarial training: a regularization method for supervised and semi-supervised learning," IEEE transactions on pattern analysis and machine intelligence, Aug. 2019, 41(8):1979-1993.

Mnih et al., "Asynchronous methods for deep reinforcement learning," Proceedings of The 33rd International Conference on Machine Learning, 2016, 48:1928-1937.

Mnih et al., "Human-level control through deep reinforcement learning," Nature, Feb. 2015, 518:529-533.

Nair et al., "Rectified linear units improve restricted boltzmann machines," International Conference on Machine Learning, Jan. 2010, 8 pages.

Noroozi et al., "Unsupervised learning of visual representations by solving jigsaw puzzles," European Conference on Computer Vision, Sep. 2016, 19 pages.

Oquab et al., "Learning and transferring mid-level image representations using convolutional neural networks," Proceedings of the IEEE Conference on Computer Vision and Pattern Recognition, 2014, pp. 1717-1724.

Owen, "A robust hybrid of lasso and ridge regression," Contemporary Mathematics, Oct. 2006, 443(7):59-72.

Parkhi et al., "Cats and dogs," 2012 Computer Vision and Pattern Recognition, Jun. 2012, 8 pages.

Pascanu et al., "On the difficulty of training recurrent neural networks," Proceedings of the 30th International Conference on Machine Learning, 2013, 28(3):1310-1318.

Pathak et al., "Context encoders: Feature learning by inpainting," Proceedings of the IEEE Conference on Computer Vision and Pattern Recognition, 2016, pp. 2536-2544.

Pathak et al., "Learning features by watching objects move," Proceedings of the IEEE Conference on Computer Vision and Pattern Recognition, 2017, pp. 2701-2710.

Poole et al., "On variational bounds of mutual information," CoRR, May 2019, arXiv:1905.06922, 14 pages.

Rasmus et al., "Semi-supervised learning with ladder networks," CoRR, Jul. 2015, arxiv.org/abs/1507.02672, 19 pages.

Ren et al., "Faster R-CNN: Towards real-time object detection with region proposal networks," CoRR, Jun. 2015, arxiv.org/abs/1506.01497, 14 pages.

Rezende et al., "Stochastic back-propagation and variational inference in deep latent gaussian models," CoRR, Jan. 2014, arXiv:1401.4082, 14 pages.

Russakovsky et al., "ImageNet Large Scale Visual Recognition Challenge," International Journal of Computer Vision, Apr. 2015, 115(3):211-252.

Saunshi et al., "A theoretical analysis of contrastive unsupervised representation learning," Proceedings of the 36th International Conference on Machine Learning, 2019, 97:5628-5637.

Simonyan et al., "Very deep convolutional networks for large-scale image recognition," CoRR, Sep. 2014, preprint arXiv:1409.1556, 14 pages.

Sohn et al., "Fixmatch: Simplifying semi-supervised learning with consistency and confidence," CoRR, Jan. 2020, arXiv:2001.07685, 21 pages.

Szegedy et al., "Rethinking the inception architecture for computer vision," Proceedings of the IEEE Conference on Computer Vision and Pattern Recognition, 2016, pp. 2818-2826.

Tarvainen et al., "Mean teachers are better role models: Weight-averaged consistency targets improve semi-supervised deep learning results," CoRR, Mar. 2017, arxiv.org/abs/1703.01780, 16 pages.

Tian et al., "Contrastive multiview coding," CoRR, Jun. 2019, arXiv:1906.05849v4, 16 pages.

Tian et al., "What makes for good views for contrastive learning," CoRR, May 2020, arXiv:2005.10243, 24 pages.

Van den Oord et al., "Representation learning with contrastive predictive coding," CoRR, Jul. 2018, preprint arXiv:1807.03748, 13 pages.

Vincent et al., "Extracting and composing robust features with denoising autoencoders," Proceedings of the 25th international conference on Machine learning, Jul. 2008, pp. 1096-1103.

Wiskott et al., "Slow feature analysis: Unsupervised learning of invariances," Neural Computation, Apr. 2002, 14(4):715-770.

Wu et al., "Group normalization," CoRR, Mar. 2018, arxiv.org/abs/1803.08494, 10 pages.

Wu et al., "Sampling matters in deep embedding learning," Proceedings of the IEEE International Conference on Computer Vision, 2017, pp. 2840-2848.

Wu et al., "Unsupervised feature learning via non-parametric instance discrimination," Proceedings of the IEEE Conference on Computer Vision and Pattern Recognition, 2018, pp. 3733-3742.

Xiao et al., "Sun database: Large-scale scene recognition from abbey to zoo," 2010 IEEE Computer Society Conference on Computer Vision and Pattern Recognition, Jun. 2010, 9 pages.

You et al., "Scaling SGD batch size to 32k for imagenet training," Electrical Engineering and Computer Sciences University of California at Berkeley, Sep. 16, 2017, Technical Report No. UCB/EECS-2017-156, 14 pages.

(56) References Cited

OTHER PUBLICATIONS

Zagoruyko et al., "Wide residual networks," CoRR, May 2016, arXiv:1605.07146, 15 pages.
Zhai et al., "A large-scale study of representation learning with the visual task adaptation benchmark," CoRR, Oct. 2019, arxiv.org/abs/1910.04867, 33 pages.
Zhai et al., "S4L: Self-supervised semi-supervised learning," Proceedings of the IEEE/CVF International Conference on Computer Vision, 2019, pp. 1476-1485.
Zhang et al., "Colorful image colorization," European Conference on Computer Vision, Sep. 2016, 29 pages.
Zhou et al., "Places: A 10 million image database for scene recognition," IEEE Transactions on Pattern Analysis and Machine Intelligence, Jun. 2018, 40(6):1452-1464.
Zhu et al., "Introduction to semi-supervised learning," Synthesis Lectures on Artificial Intelligence and Machine Learning, 2009, 3(1):1-130.
Zhuang et al., "Local aggregation for unsupervised learning of visual embeddings," Proceedings of the IEEE/CVF International Conference on Computer Vision, 2019, pp. 6002-6012.
Decision to Grant Patent in Japanese Appln. No. 2022-560500, dated Apr. 22, 2024, 5 pages.
Huang et al., "Arbitrary Style Transfer in Real-time with Adaptive Instance Normalization," CoRR, Jul. 30, 2017, arxiv.org/abs/1703.06868v2, 11 pages.
Office Action in European Appln. No. 21731442.6, dated Nov. 29, 2024, 22 pages.
Office Action in Japanese Appln. No. 2024-082493, dated Dec. 2, 2024, 6 pages (with English translation).
Office Action in European Appln. No. 21731442.6, dated Nov. 29, 2023, 12 pages.
Office Action in Japanese Appln. No. 2022-560500, dated Oct. 30, 2023, 12 pages (with English translation).
Office Action in Canadian Appln. No. 3174279, dated Mar. 13, 2024, 6 pages.
Office Action in Japanese Appln. No. 2024-082493, dated Apr. 15, 2025, 6 pages (with English translation).
Khosla et al., "Supervised contrastive learning," Advances in neural information processing systems, Apr. 23, 2020, 33:18661-18673.
Office Action in Canadian Appln. No. 3174279, dated Jun. 17, 2025, 8 pages.
Office Action in Korean Appln. No. 10-2022-7034239, mailed on Sep. 5, 2025, 18 pages (with English translation).
Office Action in Chinese Appln. No. 202180025878.9, mailed on Dec. 19, 2025, 16 pages (with English translation).
Extended Search Report in European Appln. 25226277.9, mailed on Apr. 21, 2026, 16 pages.
Notice of Allowance in Chinese Appln. No. 202180025878.9, mailed on Apr. 23, 2026, 7 pages (with English translation).

* cited by examiner

300

PROVIDE INPUT DATA ITEM TO TRAINED
ENCODER NEURAL NETWORK

302

PROCESS THE INPUT DATA ITEM USING THE
TRAINED ENCODER NEURAL NETWORK

304

OUTPUT A REPRESENTATION OF THE INPUT
DATA ITEM FROM THE TRAINED ENCODER
NEURAL NETWORK

306

PROCESS THE REPRESENTATION OF THE
INPUT DATA ITEM TO PERFORM A TASK

Data item 102 → | Encoder neural network 112 | → | System head 402 | → System output 404

Data item processing neural network system 400

400
TRAIN THE ENCODER NEURAL NETWORK OF THE ONLINE NEURAL NETWORK BY BOOTSTRAPPING

402
TRAIN NEURAL NETWORK SYSTEM INCLUDING THE ENCODER NEURAL NETWORK ON DATA ITEM PROCESSING TASK

404
USE TRAINED NEURAL NETWORK SYSTEM TO PERFORM DATA ITEM PROCESSING TASK

SELF-SUPERVISED REPRESENTATION LEARNING USING BOOTSTRAPPED LATENT REPRESENTATIONS

CROSS-REFERENCE TO RELATED APPLICATION

This application claims priority under 35 U.S.C. 119 to Provisional Application Nos. 63/039,343, filed Jun. 15, 2020 and 63/035,583, filed Jun. 5, 2020, both which are incorporated by reference.

BACKGROUND

This specification relates to image processing using machine learning models.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that is configured to learn a representation of data item such as an image through a self-supervised learning process.

A first aspect of the disclosure provides a computer-implemented method of training a neural network. The method comprises processing a first transformed view of a training data item, e.g. an image, with a target neural network to generate a target output, processing a second transformed view of the training data item, e.g. image, with an online neural network to generate a prediction of the target output, updating parameters of the online neural network to minimize an error between the prediction of the target output and the target output, and updating parameters of the target neural network based on the parameters of the online neural network.

The term "transformed view" refers to a transformed version of the training data item, e.g. image, and is used to distinguish the training data item after it has undergone a transformation, e.g. an image transformation, from the original (untransformed) training data item.

The parameters of a neural network may comprise weights of the neural network, and updating the parameters of a neural network may comprise adjusting the values of the weights.

Updating one or more parameters of the target neural network may comprise updating one or more parameters of the target neural network with a moving average of the parameters of the online neural network. The moving average may be an exponential moving average.

Updating one or more parameters of the target neural network may comprises determining updated values of the one or more parameters of the target neural network in accordance with $\xi \leftarrow \tau\xi + (1-\tau)\theta$, where $\xi$ represents the parameters of the target neural network, $\theta$ represents the parameters of the online neural network, and $\tau$ is a decay rate. The decay rate may be a value between zero and one.

The online neural network and the target neural network may each comprise a respective encoder neural network. Thus the method may further comprise performing, by each encoder neural network, operations including receiving a transformed view of the training data item, e.g. image, and processing the transformed view of the training data item, e.g. image, to generate a representation of the training data item.

Optionally, each encoder neural network may comprise a residual neural network, network i.e. a neural network with one or more residual or skip connections around one or more layers of the neural network.

When the online neural network has been trained, the encoder neural network of the online neural network may be used to generate a representation of any suitable input data item, e.g. a representation of (pixels of) an input image. An image representation thus generated may be used by other downstream tasks.

For example, an image classification operation may be performed on the image representation. As another example, an image segmentation operation may be performed on the image representation. Other image processing tasks may alternatively or additionally be performed.

The online neural network and the target neural network may each comprise a respective projection neural network. The method may further comprise performing, by each projection neural network, operations including receiving a representation of the training data item, e.g. image, and processing the representation of the training data item, e.g. image, to reduce the dimensionality of the representation. Optionally, each projection neural network may comprise a multi-layer perceptron.

The use of projection neural networks is optional, as the online neural network may directly predict the representation of the training data item, e.g. image, that is generated by the target neural network (rather than predicting a projection of the representation). However, the use of a projection neural network can provide improved performance.

The online neural network may comprise a prediction neural network. The method may further comprise performing, by the prediction neural network, operations including receiving a representation of the training data item, e.g. image, and processing the representation of the training data item, using a regression model embodied by parameters of the prediction neural network, to generate the prediction of the target output. Optionally, the prediction neural network may comprise a multi-layer perceptron. Use of a prediction neural network is not essential but can help improve stability of the training. In implementations the target neural network does not comprise a prediction neural network.

In implementations, therefore, the online neural network and the target neural network may have the same neural network architecture but different parameter values, except for one or more additional processing stages in one of the neural networks, in particular in the online neural network.

The target neural network may have a stop gradient ("sg"). The stop gradient prevents backpropagation into the target neural network, such that the parameters of the target neural network are not updated when the error is minimized.

The method may further comprise initializing the parameters of the online neural network and/or the target neural network to random values.

The method may further comprise applying a first data item transformation, e.g. image transformation to the training data item, e.g. image, to generate the first transformed view of the training data item, and applying a second data item transformation, e.g. image transformation, to the training data item to generate the second transformed view of the training data item, e.g. image. The second data item transformation, e.g. image transformation, is different from the first data item transformation, e.g. image transformation.

Where the training data item comprises a training image the first image transformation and the second image transformation may include any combination of any one or more of: random cropping; flipping along a horizontal and/or vertical axis; color jittering; conversion to grayscale; Gaussian blurring; or solarization. Other image transformations may alternatively or additionally be used. By using transformed views of the training image the online neural network learns based on the target network's representation of another transformed view of the same training image.

Although the present disclosure focuses on examples in which two different transformed views of the training data item, e.g. image, are input to the online neural network and the target neural network, in other examples a transformed view of the training data item, e.g. image, may be input to only one of the online neural network and target neural network. In these examples, the original (untransformed) training data item, e.g. image, is input to the other of the online neural network and the target neural network.

Updating one or more parameters of the online neural network may involve using a machine learning optimizer, e.g. based on stochastic gradient descent, to minimize the above described error. Updating one or more parameters of the online neural network may comprise normalizing the prediction of the target output; and minimizing a squared error between the normalized prediction of the target output and the target output.

The operations of processing the first transformed view of the training data item with the target neural network, processing the second transformed view of the training data item with the online neural network, updating the one or more parameters of the online neural network, and updating the one or more parameters of the target neural network may be performed iteratively for each training data item in a batch comprising a plurality of training data items. The parameters of the online neural network and the target neural network may be updated after each training data item in the batch has been processed.

A further aspect of the disclosure provides a computer-implemented method of processing a data item, e.g. of processing an image. The method comprises providing an input data item, e.g. image, to an online neural network, i.e. to part of the trained online neural network, the online neural network having been trained in accordance with the present disclosure; processing the input data item, e.g. image, by the online neural network i.e. using the part of the trained online neural network; outputting a representation of the input data item, e.g. image, from the online neural network i.e. from the part of the trained online neural network; and processing the representation of the input data item, e.g. image.

The online neural network may comprise a residual neural network configured to generate the representation of the input data item, e.g. image.

Where the input data item comprises an image, processing the representation of the input image may include classifying the input image, using the representation of the input image. Also or instead, processing the representation of the input image may include segmenting the input image, using the representation of the input image. Also or instead other image processing tasks may be performed.

A further aspect of the disclosure provides a system comprising one or more computers and one or more storage devices storing instructions that when executed by the one or more computers cause the one or more computers to perform any of the methods disclosed herein.

A further aspect of the disclosure provides one or more computer storage media storing instructions that, when executed by one or more computers, cause the one or more computers to perform any of the methods disclosed herein.

The subject matter described in this specification can be implemented in particular embodiments so as to realize one or more of the following advantages.

The online neural network is trained by a self-supervised learning process, whereby the online neural network learns to represent images from raw, unlabeled training data. Unlike approaches to self-supervised learning which use a contrastive loss function, the techniques disclosed herein avoid the need for negative pairs of training examples e.g. images (that is, pairs of different training examples e.g. images). This, in turn, can avoid the difficulties associated with the use of negative pairs, such as the need for large batch sizes, memory banks consisting of representations of samples in the training dataset, and the need for careful selection of negative pairs. Nevertheless when applied for example to image classification tasks, the image representations generated by the online neural network trained as disclosed herein have been found to achieve classification accuracies that are on a par with training using labelled examples and superior to some contrastive methods.

The techniques disclosed herein also avoid the high computational requirements of some methods, and as such the techniques disclosed herein are computationally efficient.

The inputs to the online neural network and the target neural may comprise e.g. any suitable type of image data, e.g. including video image data. The image data may comprise color or monochrome pixel value data. Such image data may be captured from an image sensor such as a camera or LIDAR sensor.

The image representations generated by the online neural network disclosed herein can be used for a wide variety of image processing tasks. For example, the image representations may be used for image classification, whereby a classification system outputs one or more class labels for a given input image representation. Continuing this example, the classification system may process the image representation and output scores for each of a set of object categories, with each score representing an estimated likelihood that the image contains an object belonging to the category.

As another example of an image processing task, the image representations may be used for image segmentation, whereby a segmentation system uses the image representation to label individual pixels of an input image as belonging to one of a plurality of different classes. One example use case of image segmentation is in object detection, whereby the segmentation system labels pixels of an input image in accordance with the type of object represented by each pixel.

Object detection may be used as an input to a mechanical agent, such as a robot or vehicle, which may be operating in a real-world environment. The detected objects may be, for example, obstacles (e.g., people, other mechanical agents, walls) and/or paths (e.g., roads or other surfaces upon which the mechanical agent can move). The objects thus detected can be used by a control system of the mechanical agent to make decisions on how to accomplish a mechanical task, such as controlling the direction and/or speed of movement of the mechanical agent.

Another example use case of image segmentation is to segment medical images, whereby the segmentation system labels pixels of an input medical image in accordance with whether they show a region of a human or animal body in which a particular medical condition is present. These are purely non-limiting examples of image segmentation, and there are many other practical applications of image segmentation.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

In the Figures like reference numerals indicate like elements.

DETAILED DESCRIPTION

Figure 1:
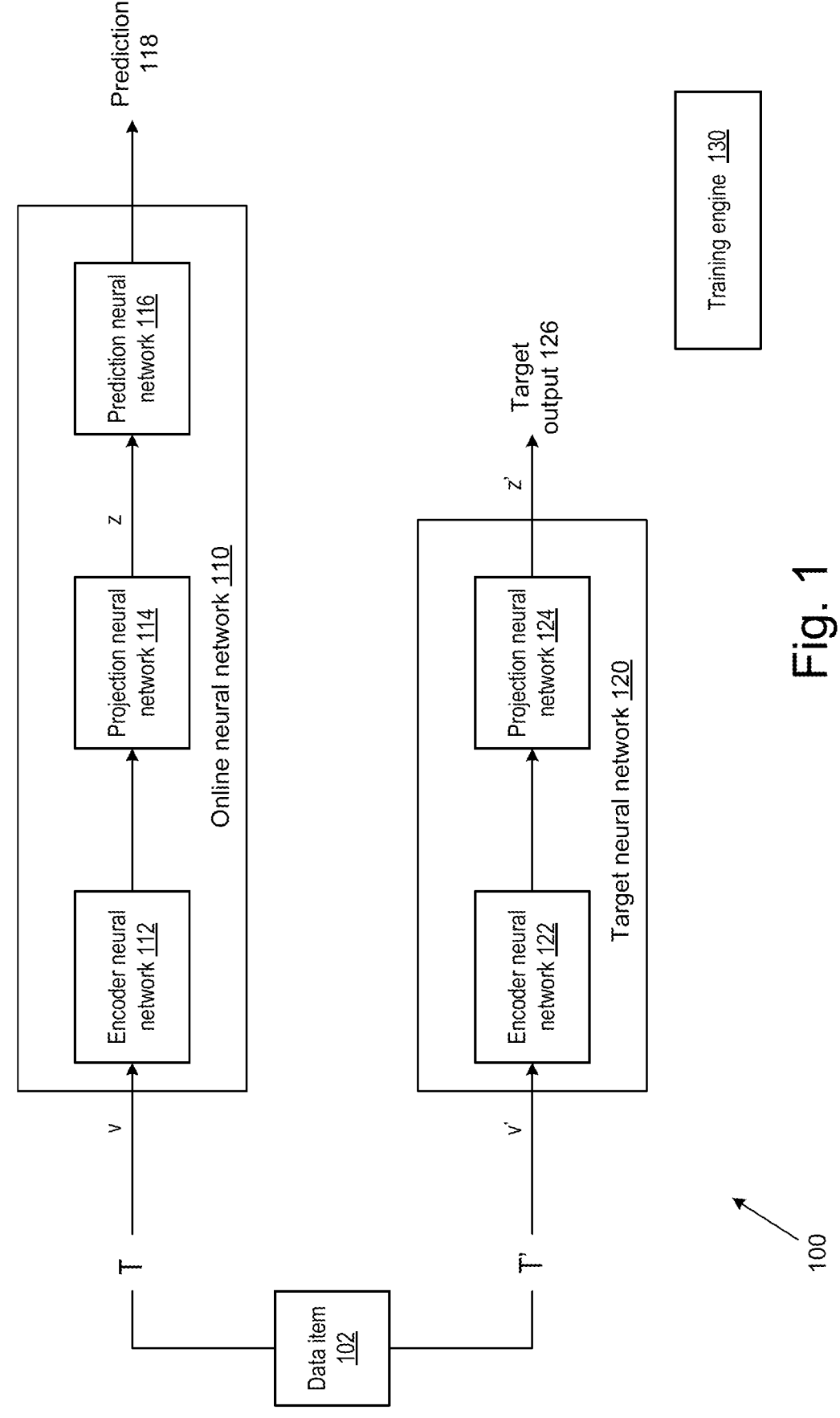
FIG. 1 shows an example neural network system including an encoder neural network.

This specification describes a method of training an encoder neural network to generate representations of data items, without using labelled training data items, and without using a contrastive loss. Methods which use a contrastive loss learn to discriminate between positive examples i.e. two transformed or "augmented" views of the same data item and negative examples which comprise augmented transformed or "augmented" views of different data items. Implementations of the described method need only positive examples for their objective function, and not negative examples, which can be awkward to generate. They can also achieve performance which approaches that of neural networks with labelled training data.

In some described examples the data items comprise images, but in general any type of data item may be processed. Some examples of different types of data item are described later. The method may be used to train an encoder neural network for performing any type of task involving processing the same type of data item as used in the training, e.g. an image.

In the case of an image data item, which as used here includes a video data item, the tasks may include any sort of image processing or vision task such as an image classification or scene recognition task, an image segmentation task e.g. a semantic segmentation task, an object localization or detection task, a depth estimation task. When performing such a task the input may comprise or be derived from pixels of the image. For an image classification or scene recognition task the output may comprise a classification output providing a score for each of a plurality of image or scene categories e.g. representing an estimated likelihood that the input data item or an object or element of the input data item, or an action within a video data item, belongs to a category. For an image segmentation task the output may comprise, for each pixel, an assigned segmentation category or a probability that the pixel belongs to a segmentation category, e.g. to an object or action represented in the image or video.

For an object localization or detection task the output may comprise data defining coordinates of a bounding box or region for one or more objects represented in the image. For a depth estimation task the output may comprise, for each pixel, an estimated depth value such that the output pixels define a (3D) depth map for the image. Such tasks may also contribute to higher level tasks e.g. object tracking across video frames; or gesture recognition i.e. recognition of gestures that are performed by entities depicted in a video.

Another example image processing task may include an image keypoint detection task in which the output comprises the coordinates of one or more image keypoints such as landmarks of an object represented in the image, e.g. a human pose estimation task in which the keypoints define the positions of body joints. A further example is an image similarity determination task, in which the output may comprise a value representing a similarity between two images, e.g. as part of an image search task.

The method is used to train a neural network system, of which the encoder neural network forms a part. The remainder of the system is not needed after training. The trained encoder neural network may be used for performing the task without further training, e.g. its parameters may be frozen, or it may be trained further to perform the specific task. In general the trained encoder neural network may be incorporated into a larger system to perform the specific task e.g. a system configured to perform an image classification, image segmentation, object localization, or depth estimation task. Thus there is also provided an image processing system incorporating the trained neural network.

In the case of image data items the transformed or "augmented" views may be transformed views of the same image. For example the image may be randomly cropped or distorted in different ways to generate the two views. In broad terms the method learns to generate representations which are robust to such transformations.

FIG. 1 shows a neural network system 100 for implementing an example of the method. The system of FIG. 1 may be implemented as one or more computer programs on one or more computers in one or more locations.

The system 100 comprises an online neural network 110 and a target neural network 120.

The target neural network 120 is configured to receive a first transformed view (v') of a data item 102. The online neural network 110 is configured to receive a second transformed view (v) of the same data item 102. The transformed views are generated by applying a respective transform (T',T) to the data item 102, as described further later. In some implementations the data item 102 comprises an image, which as used herein includes an image frame of a video.

The target neural network 120 is configured to process the first transformed view (v') of the data item to generate a target output 126 (z'). The online neural network 110 is configured to process the second transformed view (v) of the data item to generate a prediction 118 (q(z)) of the target output. The online neural network 110 is trained, e.g. by a training engine 130, by updating parameters of the online neural network using a machine learning optimizer, to minimize a difference, or error, between the prediction 118 of the target output 126 and the target output 126.

The online neural network 110 and comprises an encoder neural network 112, an optional projection neural network 114, and a prediction neural network 116 and is defined by a set of parameters of these neural networks. The target neural network 120 comprises an encoder neural network 122, and an optional projection neural network 124, and is defined by a set of parameters of these neural networks.

In some implementations, but not essentially, the target neural network 120 has the same architecture as the online neural network 110 (except for the prediction neural network) but different parameters (weights). That is, the encoder neural networks 112, 122 may be the same neural network but with different parameters; and similarly projection neural networks 114, 124 may be the same neural network but with different parameters.

The encoder neural networks 112, 122 each receive a transformed view of data item 102 and process this to generate a representation of their respective transformed view of data item 102, i.e. a high dimensional feature vector. This may be received and processed by the subsequent respective projection neural network 114, 124 to generate a reduced dimensionality representation of their respective transformed view of data item 102, i.e. a reduced dimensionality feature vector, respectively z, z'. The reduced dimensionality representation from the projection neural network 124 provides the target output 126.

The prediction neural network 116 receives the reduced dimensionality representation from projection neural network 114 (or the representation from encoder neural network 112) and processes this to generate the prediction 118. In implementations prediction 118 comprises a vector which has the same dimensionality as the target output 126. An input to the prediction neural network 116 may comprise a feature vector representation of the data item which is the same as that of the target output 126, except for the values of the feature vector. The target output 126 may be an output of the projection neural network 124 as previously described or, in some implementations, the representation from encoder neural network 122.

The encoder neural networks 112, 122 may have any architecture suitable for encoding data item 102. A result of the training method described herein is a trained encoder neural network 112. The encoder neural network 112 is trained to generate representations of the input data items, and may be any neural network which is configured to receive one the data items as an input and to generate a feature vector representation of the received data item.

For example, where a data item comprises an image or video, the encoder neural networks 112, 122 may each comprise any type of image or video encoding neural network which is configured to generate a representation, e.g. a feature vector representation, of an input image or video. Such an image or video encoding neural network may comprise one or more convolutional neural network layers, or may have any other architecture suitable for image or vision processing. In implementations such image or video encoder neural networks 112, 122 may each comprise a residual neural network i.e. a neural network with one or more residual or skip connections. Merely as an illustrative example a convolutional neural network with one or more residual or skip connections may be used, e.g. based on ResNet (He et al., arXiv:1512.03385); but it is not necessary to use a convolutional neural network.

In some implementations the encoder neural networks 112, 122 may each comprise a graph neural network e.g. a graph convolutional network. In general a graph neural network processes an input graph structure to generate an output graph structure, each defined by a set of nodes, with associated node feature vectors, connected by edges which may have associated edge feature vectors. A graph may, but need not be, defined by an adjacency matrix e.g. where N is the number of nodes an N×N matrix defining which nodes are connected by edges. An example graph convolutional network uses a neural network to define a shared function which operates on the node features to obtain updated features which are summed according to the adjacency matrix. Many physical and other systems can be represented as graphs; for example the nodes may represent bodies of a physical system or of a simulated physical system, the node features attributes of these bodies, and the edges relationships or interactions between the bodies. In another example nodes may represent parts of objects in a scene, node features physical, geometrical or visual properties of the object parts, and edges relationships between the parts. In another example elements of a data set or database may be represented as nodes, node features properties of the elements, and edges relationships between the elements. For example nodes may represent written articles, and node features article content, and edges relationships such as shared authorship or content; or nodes may represent products, and node features product features, and edges relationships between the products such as products frequently bought together. In implementations in which the encoder neural networks 112, 122 comprise graph neural networks typically projection neural networks are not used.

In general the encoder neural networks 112, 122 are configured to process data items of the type for which the encoder neural network 112 is to be trained e.g. image, video, audio, text, or other.

The projection neural networks 114, 124 may be any neural networks which are configured to reduce the dimensionality of a feature representation. For example each may comprise a multi-layer perceptron with a smaller output space than input space e.g. comprising one or more fully-connected layers, each optionally followed by a batch normalization layer (Ioffe and Szegedy, arXiv:1502.03167), followed by a fully-connected, optionally linear, output layer.

Merely by way of example, with 224×224 pixel images, the feature vector representation generated by each of the encoder neural networks may have a dimension of 4096, and the reduced dimensionality representation may have a dimension of 256.

In implementations the system may train the encoder neural network 112 to disregard the transformations applied to the data items. Taking the example of an image data item, if the transformations to the training images include color changes the feature representation could learn to disregard color. Projecting the feature representation to a reduced dimensionality representation may help maintain useful information in the feature representation.

In implementations the prediction neural network 116 may be a relatively small neural network that learns to predict the target output, e.g. to predict the reduced dimensionality representation from projection neural network 124 from the reduced dimensionality representation from projection neural network 114. Thus parameters of the prediction neural network 116 embody a regression model. In an example implementation the prediction neural network 116 comprises another multi-layer perceptron.

Optionally the output vectors of each of the target output 126 and prediction 118 may be normalized e.g. using an L2 norm. For example the target output 126, z', may be normalized as $\bar{z}'=z'/\|z'\|_2$, and the prediction 118, q(z), may be normalized as $\bar{q}(z)=q(z)/\|q(z)\|_2$, where q(·) represents the prediction neural network 116 and z is the reduced dimensionality representation from projection neural network 114.

The neural network system 100 also includes a training engine 130 configured to implement a training process for the system.

Figure 2:
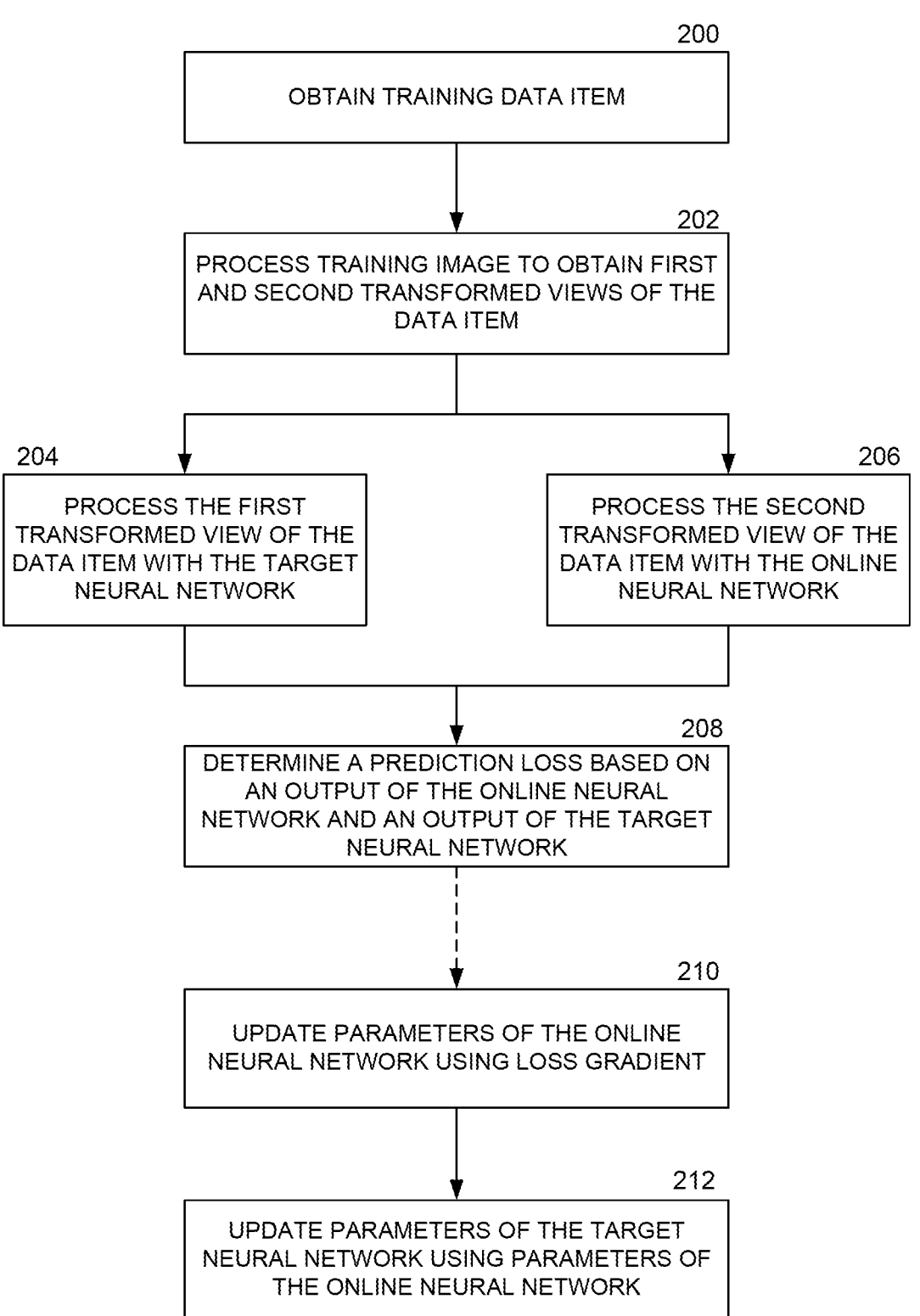
FIG. 2 shows an example process for training the system of FIG. 1.

FIG. 2 shows an example process for training the neural network system 100 of FIG. 1, in particular the encoder neural network 112. The process of FIG. 2 may be implemented as one or more computer programs on one or more computers in one or more locations.

The parameters of the online neural network 110 and of the target neural network 120 may be initialized to random values. At step 200 a training data item e.g. a training image, is obtained. This is then processed to obtain first and second differently transformed or "augmented" views of the data item (step 202). This may involve applying one or a sequence of transformations to the data item to generate each transformed view. For example each transformed view may be obtained by applying each of a set of transforms with a predetermined probability.

For example, where the training data item comprises an image the transformations may comprise one or more of: random cropping of the image, flipping the image, color jittering, color dropping, Gaussian blurring, and solarization. Random cropping may comprise selecting a random patch of the image and then expanding this to the original size of the image. Flipping the image may involve applying a horizontal or vertical flip to the image. Color jittering may comprise changing one or more of the brightness, contrast, saturation and hue of some or all pixels of the image by a random offset. Color dropping may comprise converting the image to greyscale. Gaussian blurring may comprise applying a Gaussian blurring kernel to the image; other types of kernel may be used for other types of filtering. Solarization may comprise applying a solarizing color transform to the image; other color transforms may be used. Other transforms are possible such as rotation, or cutting out part of the image (setting pixels of a random patch to a uniform value).

A transformation, e.g. of an image, may include an adversarial perturbation i.e. a perturbation which is selected to increase a likelihood that the encoder neural network 112 generates an erroneous representation. For example an adversarial attack may be implemented on one of the transformed views of the pair of transformed views, e.g. using the technique described in Madry et al., arXiv: 1706.06083, e.g. to maximize the error between the prediction 118 and the target output 126.

Where the encoder neural networks 112, 122 comprise graph neural networks the first and second differently transformed or "augmented" views of the data item may be obtained by node feature masking or edge masking. For example each node may have one or more node features masked; the same feature(s) may be masked for all the nodes. Also or instead edges may be masked e.g. using a binary mask of size E where E is the number of edges in the (original) graph. The mask may be generated stochastically e.g. according to a Bernoulli distribution; it may be expressed as a modification to the adjacency matrix, where present. Each of the first and second differently transformed views may have a different "augmentation".

There are many different transformations which can be used to obtain the transformed views. The particular types of transformations used may be varied depending on e.g. the task the encoder neural network 112 is being trained for, and on the types of variations expected amongst the data items. Optionally the transformed views may be normalized e.g. over color channels in the case of an image. Normalization may involve subtracting an average value and dividing by the standard deviation.

The first transformed view of the data item is processed by the target neural network 120 to generate the target output 126 (step 204), and the second transformed view of the data item is processed by the online neural network 110 to generate the prediction 118 of the target output (step 206). Then a prediction error is determined between the prediction 118 and the target output 126, specifically a prediction loss based on the prediction 118 and the target output 126 (step 208). The prediction loss may comprise any measure of a difference between the prediction 118 and the target output 126, optionally normalized as previously described. For example the prediction loss or error may comprise a (mean) squared error, a negative cosine or dot product similarity, or a cross-entropy loss (if feature vector values are interpreted as probabilities and normalized). For example the prediction loss or error, L, may be determined as an L-norm e.g. as $$\|\bar{q}(z) - \bar{z}'\|_2^2$$

where $\|\cdot\|_2$ denotes an L2 norm.

In some implementations the method determines a further prediction loss or error, L', with the first and second transformed views swopped, i.e. with first transformed view of the data item processed by the online neural network 110 and the second transformed view of the data item is processed by the target neural network 120. Then a symmetric prediction loss or error $L^{TOTAL}$ may be determined by summing the losses, i.e. $L^{TOTAL}=L+L'$.

The process may accumulate the prediction loss or error over a batch of training data items before proceeding.

At steps 210 and 212 the parameters of the online neural network 110 and of the target neural network 120 are updated. However only the parameters of the online neural network 110, and not those of the target neural network 120, are updated by gradient descent i.e. by backpropagating gradients of the prediction loss or error. This may be expressed as providing a "stop gradient" for the target neural network 120 i.e. by stopping gradients flowing back into the target neural network 120. In practice, however, this may be achieved by training only the online neural network 110 using the prediction loss or error.

Thus at step 210 parameters of the online neural network 110 are updated to minimize the prediction loss or error, whilst at step 212 parameters of the target neural network 120 are updated based on the parameters of the online neural network. In some implementations minimizing the error may involve maximizing a similarity, e.g. a cosine similarity, between the prediction 118 and the target output 126.

In implementations the parameters of the online neural network 110 are updated using a stochastic optimization step implemented with a machine learning optimizer such as a gradient descent based optimizer, to minimize the prediction loss or error. Other types of machine learning optimizer may be used. In implementations the optimizer minimizes the prediction loss or error, e.g. L or $L^{TOTAL}$, only with respect to the parameters of the online neural network 110, i.e. not with respect to the parameters of the target neural network 120. For example the parameters of the online neural network 110 updated may be updated by back propagating gradients of the prediction loss or error through the prediction neural network 116, the projection neural network 114 (where present), and the encoder neural network 112.

In implementations the parameters of the target neural network 120 are updated based on the parameters of the corresponding part of the online neural network 110 i.e. not based on the prediction loss or error. For example the parameters of the target neural network 120 may be determined as a copy or moving average of the parameters of the online neural network 110, e.g. a weighted or exponential moving average. In general the parameters of the target neural network 120 comprise a delayed (and more stable) version of the parameters of the online neural network 110.

In some implementations the parameters of the target neural network 120 may be determined using the update $\xi \leftarrow \tau\xi + (1-\tau)\theta$ where $\tau$ is a target decay rate in the range [0, 1], $\xi$ is the a set of parameters of the target neural network 120, and $\theta$ is the set of parameters of the online neural network 110 except for the parameters of the prediction neural network, i.e. the parameters of the encoder neural network 112 and, where present, of the projection neural network 114. Merely by way of example $\tau$ may be greater than 0.99, and may be increased during training.

Implementations of the method thus use bootstrapping as the updated, i.e. partially trained, online neural network 110 is used to update the target neural network 120 to generate a new target output for further training of the online neural network 110. Training the online neural network 110 using the new target improves the representation from the encoder neural network 112.

The representation of, say, one augmented view of an image, e.g. one random crop, may be predictive of the representation of another augmented view of the same image, e.g. a neighboring crop. Surprisingly, however, the above-described training above does not result in collapse of the feature representation of the encoder neural network 112 into a constant vector, which would be the same for all augmentations. Instead the target neural network helps to stabilize the training. It is not necessary for the target neural network 120 to be updated at the same time as or with the same frequency as the online neural network.

After the neural network system 100 has been trained all of the system except for the encoder neural network 112 (and its trained parameters) may be discarded. That is, a result of the process of FIG. 2 is a trained version of the encoder neural network 112.

Figure 3:
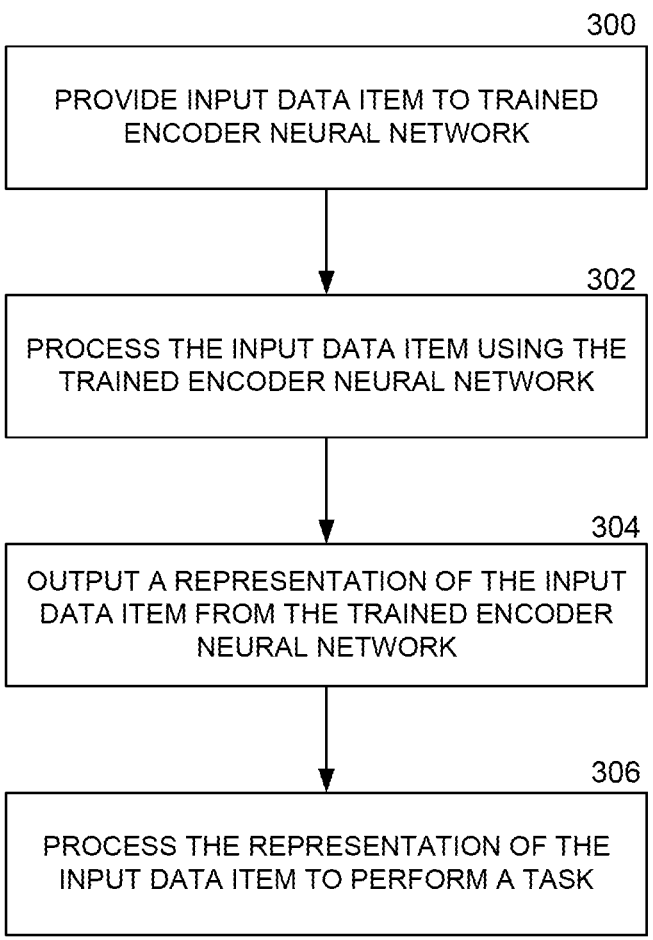
FIG. 3 shows an example process for using a trained encoder neural network.

FIG. 3 shows a process for using the trained encoder neural network 112 to process a data item, such as an image. The process may be implemented as one or more computer programs on one or more computers in one or more locations.

At step 300 an input data item, e.g. an image or video, is provided to the trained encoder neural network part of the trained online neural network 110. The input data item is processed using part or all of the trained encoder neural network 112 (step 302) to output a representation of the input data item (step 304). This is then processed further to perform a task (step 306), e.g. an image processing task as previously described. The trained encoder neural network 112 may be used to perform any processing task processing e.g. data items of the same type as those used to train the system.

Depending on the task, not all of the trained encoder neural network 112 may be needed to process a data item. Thus the representation output from the trained encoder neural network 112 may be the above described feature vector representation, or the representation output may be an output from an intermediate layer or "backbone" of the encoder neural network 112 rather than e.g. the output from a final fully-connected layer. For example where the encoder neural network has a ResNet architecture the representation output may be an output from an intermediate convolutional neural network layer.

Figure 4A:
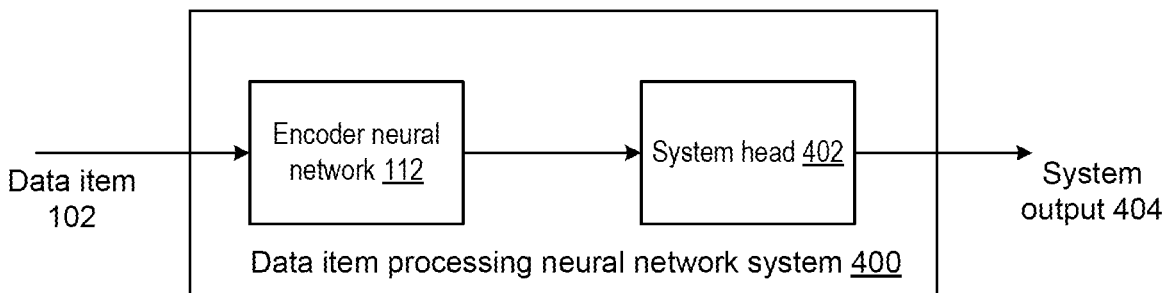
FIGS. 4a and 4b show an example neural network system including a trained encoder neural network, and an example process for training and using the system.

FIG. 4a shows a computer-implemented data item processing neural network system 400 comprising trained encoder neural network 112 (or part thereof) and an optional system head 402, adapted to a data item processing task to be performed. The system 400 is configured to receive a data item as an input and to process the data item using the trained encoder neural network 112 (or part thereof) to output a representation of the input data item.

In some implementations a system output 404 for performing the data item processing task comprises the representation output from the trained encoder neural network 112. In some implementations the representation output from the trained encoder neural network 112 is further processed by the system head 402 to generate the system output 404 for the task.

As one example the representation output from the trained encoder neural network 112 comprises a feature vector representation which may be used to evaluate the similarity between two data items e.g. between two images. This may involve presenting each data item in turn to the encoder neural network 112 to generate a respective feature vector representation, and then comparing the representations using a similarity measure e.g. a distance metric such as an L-norm, or a dot product or cosine similarity measure. The similarity measure may be used, e.g., to detect when it is likely that a data item has been copied for duplicate or near-duplicate detection. This may also be used for data item verification. As another example, the feature vector representation output from the trained encoder neural network 112 may be used to evaluate the similarity between a target data item, e.g. a target image or video, and each of multiple data items, e.g. images or videos, in a database. The closest, or one of the closest, may be selected to retrieve from the database a data item or items which are similar to the target data item.

As a further example, a final output layer or layers of the trained encoder neural network 112 may be discarded after training and the representation output from the trained encoder neural network 112 may comprise a feature map output generated from (what was previously) an intermediate layer of the encoder neural network 112. Such a feature map can have utility e.g. to identify features of an input data item such as an input image, and the data item processing task may be a task to generate such a feature map from the input data item e.g. from an input image or images.

In some example implementations in which the data items are images and in which the representation output from the trained encoder neural network 112 is further processed by the system head 402, the neural network system 400 is an image processing system. For an image classification or scene recognition task the system head 402 may comprise a classifier e.g. a linear classifier. For a semantic segmentation task the representation output may be an output from an intermediate layer or "backbone" of the encoder neural network 112, e.g. from a ResNet convolutional layer, and the system head 402 may comprise semantic segmentation decoder neural network e.g. a convolutional neural network with a final 1×1 convolution for per-pixel classification. For an object detection task the representation output may also be an output from an intermediate layer or "backbone" of the encoder neural network 112 and the system head 402 may comprise a bounding box prediction neural network head. For a depth estimation task the representation output may be an output from an intermediate layer or "backbone" of the encoder neural network 112 and the system head 402 may comprise a convolutional neural network with one or more up-sampling blocks. In these examples the system output 404 may be an output for the task as previously described.

As another example, the representation output may be an output from an intermediate layer or "backbone" of the encoder neural network 112, the system head 402 may comprise a reinforcement learning system, and the system output 404 may be an action selection output for selecting an action to be performed by an agent e.g. a mechanical agent in e.g. a real world environment.

The data item processing neural network system 400 may be trained to perform the data item processing task. In some implementations, during such training the parameters of the trained encoder neural network 112 in the system 400 may be frozen and whilst parameters of the system head 402 are trained. In some implementations, during such training the parameters of the trained encoder neural network 112 and the parameters of the system head 402 may be jointly trained, to fine tune the parameters of the encoder neural network 112 to the task, optionally with some regularization.

Figure 4B:
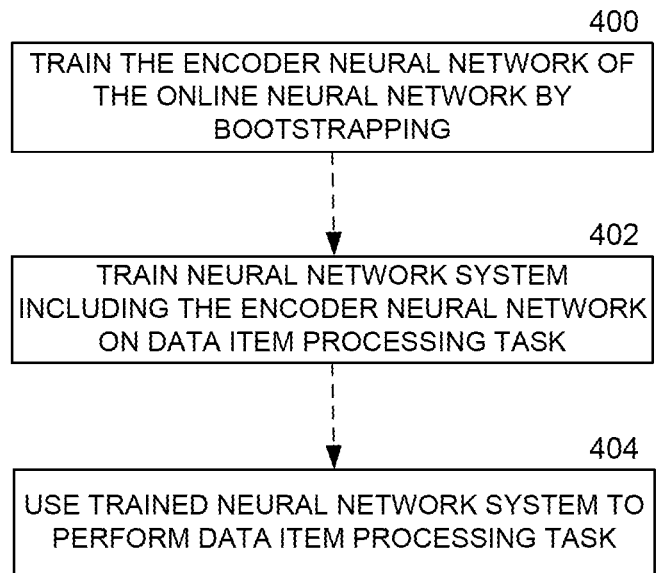

FIG. 4*b* shows a process for training and using the data item processing neural network system 400 to perform a data item processing task. The process may be implemented as one or more computer programs on one or more computers in one or more locations.

FIG. 4*b* shows that the online neural network 110 including the encoder neural network 112 has previously been trained e.g. by the bootstrapping process of FIG. 2 (step 400). At step 402 the process trains the system 400 by any machine learning technique, e.g. backpropagation of gradients of an objective function, to perform the data item processing task, using the same training data items as previously or new training data items. Step 402 may, but need not, include further training of parameters of the encoder neural network 112 (or the part thereof included in system 400). Then at step 404 the trained system 400 may be used to perform the data item processing task.

Figure 5:
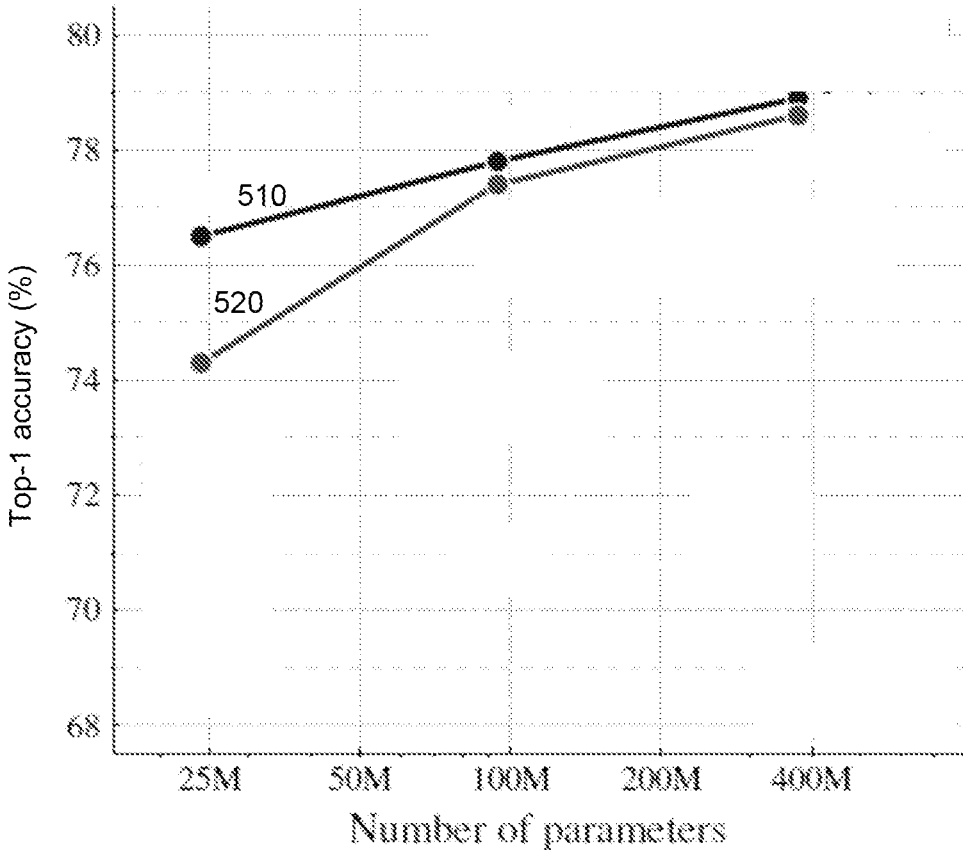
FIG. 5 illustrates performance of the trained encoder neural network on an image classification task.

FIG. 5 relates to classification of images from the ImageNet database (Russakovsky et al., arXiv:1409.0575). The y-axis shows percentage top-1 accuracy, i.e. the accuracy of the prediction with the highest probability; the x-axis shows the number of parameters in the neural network performing the classification.

In FIG. 5 curve 510 is for a ResNet-200 image classifier with supervised training. Curve 520 is for an image classification system comprising a ResNet-50 encoder neural network, followed by a linear classifier trained on top of the feature vector representation with the encoder neural network parameters frozen. The ResNet-50 encoder neural network is an encoder neural network 112 that has been trained as described above. The trained encoder neural network 112 performs better than other self-supervised approaches using a contrastive loss (not shown in FIG. 5), and approaches the performance of supervised training.

The data items may in general be any type of data item, including images and video frames as previously described. For example a data item may be an audio data item i.e. a data item comprising a representation of a digitized audio waveform e.g. a speech waveform. Such a representation may comprise samples representing digitized amplitude values of the waveform or, e.g., a time-frequency domain representation of the waveform such as a STFT (Short-Term Fourier Transform) or MFCC (Mel-Frequency Cepstral Coefficient) representation. In this case the transformed or augmented "views" of the data item may also include random crops, but in the time or frequency domain rather than in the spatial domain, e.g. selections of portions of the audio data item with random start and end times or with randomly selected upper and lower frequencies. Other transformed or augmented "views" of the data item may include modifications to the amplitude of a data item e.g. by randomly increasing or diminishing the amplitude of the audio; or modifications to the frequency characteristics of the audio e.g. by randomly filtering the audio.

Instead of a data item representing an audio waveform the data item may represent the waveform of any signal e.g. a signal from a sensor e.g. a sensor sensing a characteristic of an object or of the real world. Then the transformed views of the data item may correspond to those described above for an audio waveform.

Where the data item represents a waveform e.g. an audio waveform, the data item processing task may comprise, for example: An identification or classification task such as a speech or sound recognition task, a phone or speaker classification task, or an audio tagging task, in which case the output may be a category score or tag for a data item or for a segment of the data item; or a similarity determination task e.g. an audio copy detection or search task, in which case the output may be a similarity score.

In some implementations a data item may be a text data item, and the transformed or augmented "views" of the data item may comprise crops of the data item or distortions of the data item such as grammar or spelling distortions. A data item processing task may comprise an identification or classification task, or a similarity determination task, e.g. to generate a category score, a similarity score, or a tag as described above; or a machine translation task. A data item may also represent an observation e.g. an observation of advertisement impressions or a click-through counts or rate, e.g. in combination with other data such as text data. The transformed views may then similarly include distortions of the data items, and similar tasks may be performed.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented using a graphics processing unit (GPU) or Tensor Processing Unit (TPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The typical elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

training a target neural network by the one or more computers and using a machine learning technique, the training comprising:

processing a first transformation of a training data item with the target neural network to generate a target output comprising a first representation of the training data item;

processing a second transformation of the training data item with an online neural network to generate a prediction of the target output, wherein the online neural network comprises: (i) an encoder subnetwork having a same architecture as the target neural network but different parameter values from the target neural network, and (ii) a prediction subnetwork that comprises one or more neural network layers and that is separate from the encoder subnetwork, wherein processing the second transformation of the training data item with the online neural network comprises:

processing the second transformation of the training data item using the encoder subnetwork of the online neural network to generate a second representation of the training data item; and processing the second representation of the training data item using the prediction subnetwork of the online neural network to generate the prediction of the target output;

updating one or more parameters of the online neural network to minimize an error between the prediction of the target output and the target output; and updating one or more parameters of the target neural network based on the parameters of the encoder subnetwork of the online neural network.

2. The method of claim 1, wherein updating one or more parameters of the target neural network comprises:

updating one or more parameters of the target neural network with a moving average of the parameters of the encoder subnetwork of the online neural network.

3. The method of claim 1, wherein updating one or more parameters of the target neural network comprises:

determining updated values of the one or more parameters of the target neural network in accordance with $\xi \leftarrow \tau\xi + (1-\tau)\theta$, where $\xi$ represents the parameters of the target neural network, $\theta$ represents the parameters of the encoder subnetwork of the online neural network, and $\tau$ is a decay rate.

4. The method of claim 1, wherein the encoder subnetwork of the online neural network and the target neural network each comprise a respective residual neural network.

5. The method of claim 1, wherein:

the online neural network and the target neural network each comprise a respective projection neural network; and processing the first transformation of the training data item with the target neural network further comprises:

processing the first representation of the training data item using the projection neural network of the target neural network to reduce a dimensionality of the first representation of the training data item; and processing the second transformation of the training data item with the online neural network further comprises:

processing the second representation of the training data item using the projection neural network of the online neural network to reduce a dimensionality of the second representation of the training data item.

6. The method of claim 5, wherein the projection neural network of the target neural network and the projection neural network of the online neural network each comprise a respective multi-layer perceptron.

7. The method of claim 1, processing the second representation of the training data item using the prediction subnetwork of the online neural network to generate the prediction of the target output comprises:

processing the second representation of the training data item, using a regression model embodied by parameters of the prediction subnetwork of the online neural network, to generate the prediction of the target output.

8. The method of claim 7, wherein the prediction subnetwork of the online neural network comprises a multi-layer perceptron.

9. The method of claim 1, further comprising:

initializing the parameters of the online neural network and/or the target neural network to random values.

10. The method of claim 1, further comprising:

applying a first data item transformation to the training data item to generate the first transformed view of the training data item; and applying a second data item transformation to the training data item to generate the second transformed view of the training data item, wherein the second data item transformation is different from the first data item transformation.

11. The method of claim 1, wherein updating one or more parameters of the online neural network comprises:

normalizing the prediction of the target output; and minimizing a squared error between the normalized prediction of the target output and the target output.

12. The method of claim 1, further comprising iteratively performing the operations of processing the first transformed view of the training data item with the target neural network and processing the second transformed view of the training data item with the online neural network, for each training data item in a batch comprising a plurality of training data items; and then updating the one or more parameters of the online neural network and updating the one or more parameters of the target neural network.

13. A computer-implemented method of processing a data item, the method comprising:
  providing an input data item to part of a trained online neural network, the online neural network having been trained by performing operations comprising:
    processing a first transformation of a training data item with the target neural network to generate a target output comprising a first representation of the training data item;
    processing a second transformation of the training data item with an online neural network to generate a prediction of the target output, wherein the online neural network comprises: (i) an encoder subnetwork having a same architecture as the target neural network but different parameter values from the target neural network, and (ii) a prediction subnetwork that comprises one or more neural network layers and that is separate from the encoder subnetwork,
    wherein processing the second transformation of the training data item with the online neural network comprises:
      processing the second transformation of the training data item using the encoder subnetwork of the online neural network to generate a second representation of the training data item; and
      processing the second representation of the training data item using the prediction subnetwork of the online neural network to generate the prediction of the target output;
    updating one or more parameters of the online neural network to minimize an error between the prediction of the target output and the target output; and
    updating one or more parameters of the target neural network based on the parameters of the encoder subnetwork of the online neural network
  processing the input data item using the part of the trained online neural network;
  outputting a representation of the input data item from the part of the trained online neural network; and
  processing the representation of the input data item.

14. The method of claim 13, wherein the online neural network comprises a residual neural network configured to generate the representation of the input data item.

15. The method of claim 13, wherein processing the representation of the input data item includes:
  classifying the input data item, using the representation of the input data item.

16. The method of claim 13, wherein the input data item comprises an input image.

17. The method of claim 1, wherein the training data item comprises an image, the method further comprising generating a representation of pixels of an input image using the encoder subnetwork of the trained online neural network; and using the representation to perform an image processing task.

18. A system comprising one or more computers and one or more storage devices storing instructions that when executed by the one or more computers cause the one or more computers to perform operations comprising:
  training a target neural network by the one or more computers and using a machine learning technique, the training comprising:

processing a first transformation of a training data item with the target neural network to generate a target output comprising a first representation of the training data item;
    processing a second transformation of the training data item with an online neural network to generate a prediction of the target output, wherein the online neural network comprises: (i) an encoder subnetwork having a same architecture as the target neural network but different parameter values from the target neural network, and (ii) a prediction subnetwork that comprises one or more neural network layers and that is separate from the encoder subnetwork,
    wherein processing the second transformation of the training data item with the online neural network comprises:
      processing the second transformation of the training data item using the encoder subnetwork of the online neural network to generate a second representation of the training data item; and
      processing the second representation of the training data item using the prediction subnetwork of the online neural network to generate the prediction of the target output;
    updating one or more parameters of the online neural network to minimize an error between the prediction of the target output and the target output; and
    updating one or more parameters of the target neural network based on the parameters of the encoder subnetwork of the online neural network.

19. One or more computer storage media storing instructions that when executed by one or more computers cause the one or more computers to perform operations comprising:
  training a target neural network by the one or more computers and using a machine learning technique, the training comprising:
    processing a first transformation of a training data item with the target neural network to generate a target output comprising a first representation of the training data item;
    processing a second transformation of the training data item with an online neural network to generate a prediction of the target output, wherein the online neural network comprises: (i) an encoder subnetwork having a same architecture as the target neural network but different parameter values from the target neural network, and (ii) a prediction subnetwork that comprises one or more neural network layers and that is separate from the encoder subnetwork,
    wherein processing the second transformation of the training data item with the online neural network comprises:
      processing the second transformation of the training data item using the encoder subnetwork of the online neural network to generate a second representation of the training data item; and
      processing the second representation of the training data item using the prediction subnetwork of the online neural network to generate the prediction of the target output;
    updating one or more parameters of the online neural network to minimize an error between the prediction of the target output and the target output; and updating one or more parameters of the target neural network based on the parameters of the encoder subnetwork of the online neural network.

20. The one or more computer storage media of claim 19, wherein updating one or more parameters of the target neural network comprises:

updating one or more parameters of the target neural network with a moving average of the parameters of the encoder subnetwork of the online neural network.

\* \* \* \* \*